United States Patent [19]
Lang et al.

[11] Patent Number: 5,901,609
[45] Date of Patent: May 11, 1999

[54] METHOD AND APPARATUS FOR A LOW FRICTION SAFELOCK SYSTEM

[75] Inventors: David J. Lang, Rockford; Neil L. Brown, Stillman Valley; Gary L. Voss, Byron, all of Ill.

[73] Assignee: Sundstrand Corporation, Rockford, Ill.

[21] Appl. No.: 08/712,972

[22] Filed: Sep. 12, 1996

[51] Int. Cl.$^6$ .................................................. F16H 57/10
[52] U.S. Cl. ..................... 74/411.5; 74/530; 74/813 L; 188/70 R
[58] Field of Search .................. 74/411.5, 530, 74/813 L; 188/70 R

[56] References Cited

U.S. PATENT DOCUMENTS

| | | | |
|---|---|---|---|
| 3,633,719 | 1/1972 | Lynch | 70/190 |
| 4,332,369 | 6/1982 | Gordon et al. | 74/530 X |
| 4,827,787 | 5/1989 | Gillingham et al. | 74/411.5 |

*Primary Examiner*—Allan D. Herrmann
*Attorney, Agent, or Firm*—Ryan M. Fountain

[57] ABSTRACT

A safelock system for removable gears is provided having a self-seating gear segment rotatably mounted on a helical ball spline for bi-directional axial movement with respect to the gear teeth to be locked. A relubrication structure is provided to service the interior of the ball spline. The interlocking teeth are two-dimensionally tapered from the point of initial engagement. Diverse biasing structures are employed to facilitate the axial self-seating reaction of the gear segment after initial engagement with the gear to be locked.

7 Claims, 2 Drawing Sheets

METHOD AND APPARATUS FOR A LOW FRICTION SAFELOCK SYSTEM

BACKGROUND AND SUMMARY OF THE INVENTION

The present invention relates generally to arrangements for preventing the movement of a gear and, more particularly, to gear locking mechanisms having jam prevention structures.

A wide variety of devices have been used to selectively prevent rotational movement of gears and lock against actuation of whatever application is driven by the gears. In general, such arrangements can be referred to as "safelock" systems. However, the environment where the safelock system is employed can restrict the availability of certain prior devices for that purpose.

For example, in an aircraft hydraulic, mechanical and/or electrical power sources can employ gears to transmit power or actuation force to a variety of applications. In addition to the positive lock and safety criterion of ground-based safelock systems, the aircraft environment requires the arrangement to be lightweight, compact in size, highly reliable over long periods of time and unusually rugged with respect to mechanical and thermal stresses. In addition, ease of maintenance and serviceability are important design considerations.

As a specific example, safelock systems have previously been used to prevent inadvertent actuation of weapons access doors on military aircraft. One such safelock system included a gear segment which was selectively rotatable into engagement with the carrier gear of a hydraulic motor. The gear segment was supported for axial movement in either direction (backward or forward with respect to the direction of travel of the gear teeth) along the rotational axis between a plurality of biasing springs by a cam and pin assembly. Such bi-directional axial motion was intended to reduce the incidence of jamming between the gear teeth and the teeth of the gear segment by permitting the gear segment to be self seating between the gear teeth.

To further prevent such jamming, the gear teeth and teeth of the gear segment were modified to include a taper from the side upon which those teeth first engage. That taper was typically "two dimensional" in that it was directed both inwardly from the side and downwardly from the top of the teeth.

Unfortunately, such prior safelock devices were subject to undesirably high friction upon actuation and, thus, did not always perform optimally. Accordingly, it was previously suggested to replace the cam/pin assembly with a ball bearing assembly. Unfortunately, single or three ball sets proved insufficient to sustain the load requirements, and significantly reduce actuation friction. As a result, a multiple ball array, such as a helical ball spline, was proposed. While such an array permitted significantly lower actuation friction, reliability maintenance for longer periods of time required relubrication of the array, preferably at the interior and outwardly from the longitudinal axis of the array. It was found, however, that acceptable relubrication structures interfered with the use of prior bi-directional spring biasing structures.

Biasing for axial motion of the gear segment forward with respect to the jack gear was still feasible using the prior biasing structure with the relubrication structure, but there was insufficient room for the prior backward motion biasing structure without at least significantly enlarging the size of the safelock assembly and complicating serviceability. In general, the prior biasing structures included helical springs on either side of the gear segment to achieve axially backward and forward biasing. Where only axially forward biasing was used, a helical spring was mounted on one side of the gear segment.

Accordingly, it is an object of this invention to provide an improved safelock system, especially for use in efficiency conscious environments such as aircraft. Further objects include at least providing a safelock system:

A. requiring reduced actuation friction,
B. having a long useful life,
C. with a decreased tendency to jam,
D. of minimal cost and dimension, and
E. which is easy to maintain and service.

These objectives are attained by the provision of a safelock system having a self-seating gear segment rotatably mounted on a helical ball spline for bi-directional axial movement with respect to the gear teeth to be locked. A relubrication structure is provided to service the interior of the ball spline. The interlocking teeth are two-dimensionally tapered from the point of initial engagement. Diverse biasing structures acting on opposing sides of the gear segment are employed to facilitate the axial self-seating reaction of the gear segment after initial engagement with the gear to be locked.

Other objects, advantages and novel features of this invention will become readily apparent from the following drawings and detailed description of preferred embodiments.

DETAILED DESCRIPTION OF PREFERRED EMBODIMENTS

Figure 1:
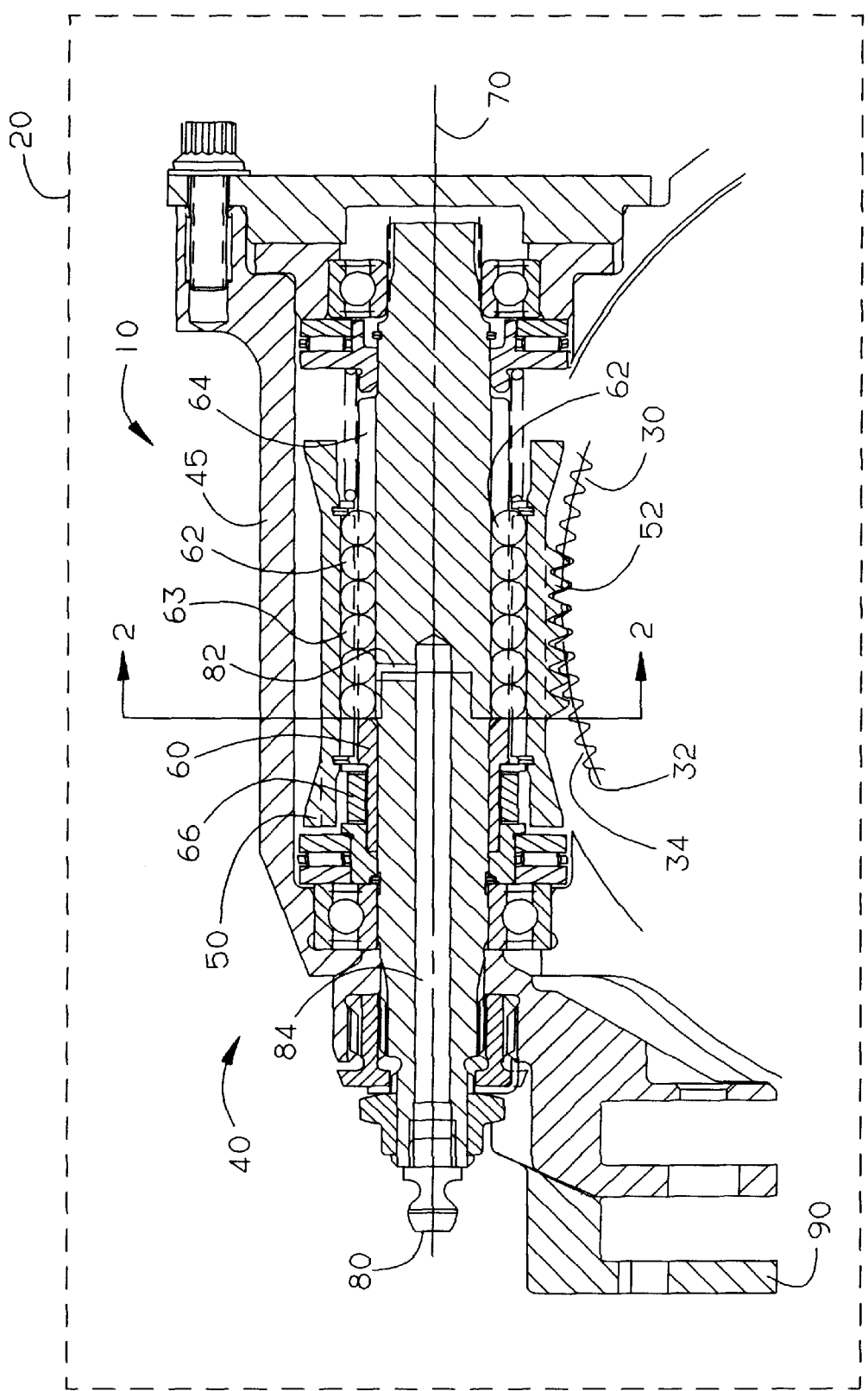
FIG. 1 shows a cross sectional view of a safelock system in an actuated position according to the teachings of the present invention.

FIG. 1, which illustrates a preferred embodiment of the present invention, shows a safelock system 10 as mounted inside of an aircraft 20. The structure can be advantageously employed with respect to either or both a carrier gear of a hydraulic motor or a jack gear of an electric motor, such as those used to drive opening and closing of the doors on the B-2 aircraft. In that regard, the safelock system would help prevent the doors from being actuated inadvertently either on the ground or in the air.

Safelock system 10 includes, for example, a gear member 30 and a lock assembly 40. Gear member 30 is shown as being a circular rack having a plurality of teeth 32 each separated by gear space 34. Gear member 30 may alternatively be formed as a linear rack. Typically, gear member 30 is connected to a source of actuation power, such as a hydraulic motor. As such, in FIG. 1, gear number 30 would preferably rotate forward clockwise.

Figure 3:
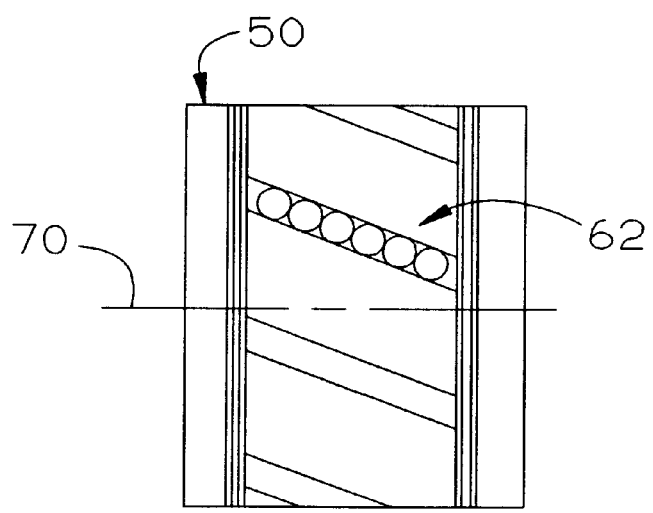
FIG. 3 shows a roll out view of a helical ball spline shown in FIG. 1.

Lock assembly 40 includes a housing 45 having therein a gear segment 50, which serves as the locking member 50 with respect to gear member 30, and a support structure 60 mounted about longitudinal axis 70. That support structure has at least one array of ball bearings, such as helical ball spline 62 (best seen in FIG. 3), engaging gear segment 50, and biasing members 64 and 66, each associated with one end of gear segment 50. Relubricating structure 80 is preferably formed between support structure 60 and axis 70 with a passageway 82 connecting lubricant reservoir 84 to the ball spine. Efficient lubrication for longer term reliability can be achieved by locating passageway 82 to extend radially outward from axis 70 and intersect with the interior intermediate balls 63 of the ball spline rather than apply lubricant from an end of the ball spline. Lock assembly 40 further includes actuation lever 90 connected to gear segment 50 at one end thereof.

Gear segment 50 is rotatable about axis 70 and includes a plurality of spaced apart lock teeth 52. Gear segment 50 can be formed as a mating arc with respect to gear member 30 or as a linear rack of teeth for locking with the teeth of gear member 30. Teeth 52 are dimensioned so as to fit within gear spaces 34, having some clearance therein in a conventional manner.

Figure 2:
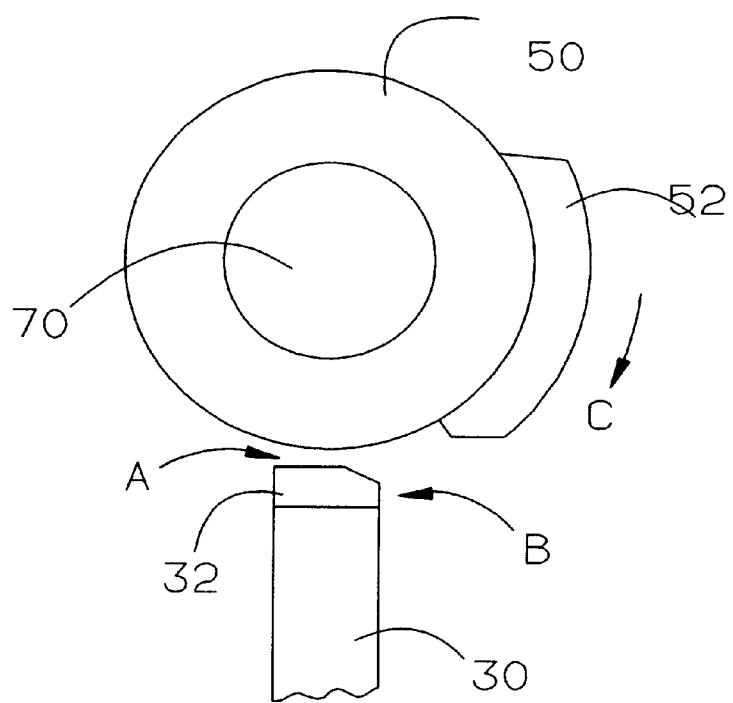
FIG. 2 shows a partial cross sectional view along line 2—2 of the safelock system of FIG. 1 in a nonactuated position, although the components shown are not drawn to scale with respect to FIG. 1.

Preferably, teeth 32 and 52 are each tapered at one side in two dimensions, as shown in exaggerated format in FIG. 2. One dimension taper is from the top A of each tooth downwardly, the taper being greatest at side B. The other dimension of taper is from side B inwardly. Side B is specified as the side at which the teeth first contact each other as gear segment 50 rotates into gear member 30 in direction C. As was previously known, this tapering of the interengaging gear teeth contributes to the reduction in jamming of those teeth by reducing the "flat" surface available for initial contact. Instead, greater sloping surface area is provided to facilitate sliding of the teeth to a full contact position prior to locking.

In the embodiment shown, axis 70 is substantially parallel to and spaced apart from a tangent of the circle formed by the top of the teeth of gear member 30, the radially outermost portion of gear member 30 from its axis of rotation, upon rotation of that gear. In addition to being rotatable about axis 70 in response to actuation of lever 90, gear segment 50 is movable along longitudinal axis 70 toward either end of that axis incident to its self-seating function.

More specifically, biasing member 64, preferably a helical spring mounted in an outside diameter guide, urges gear segment 50 toward the left end of axis 70 (as seen from FIG. 1) and accomodates sliding movement of the gear segment in the forward direction (to the right). Similarly, biasing member 66, preferably a wave spring or other such flat strip spring mounted in an outside diameter guide, urges gear segment 50 toward the right end of axis 70 and accommodates sliding movement of the gear segment in the backward or aft direction (to the left).

This bi-directional axial movement of the gear segment allows it to be self-seating in that when the gear segment is rotated into gear member 30 their respective teeth engage at random positions. If the teeth initially engage only at an edge, narrow surface or other such orientation which would previously have tended to jam the gear member and gear segment, the gear segment can therafter automatically shift forward or aft along a surface of the teeth to engage the gear member at a more centered location or broader surface of the teeth, providing a more secure lock of the gears with less likelihood of damage to the teeth. The low friction movement of gear segment 50 permitted by the helical ball spline and the greater incidence of inclined, slidable surfaces created by the two-dimensional taper of the teeth facilitate this axial shift of the gear segment.

In addition to the alternative embodiments discussed herein, other variations and modifications to the present invention will now be readily appreciated without departing from the spirit of the invention and the intent of the inventors. Accordingly, the scope of this invention is limited only by the terms of the claims defined below.

We claim:

1. A gear locking arrangement for use in an environment requiring reduced friction and longer term reliability, comprising:
   a) a gear member having a plurality of rack teeth thereon,
   b) a gear segment with a plurality of rack teeth thereon,
   c) a helical ball spline movably mounting the gear segment such that the rack teeth of the gear segment are selectively engageable with the rack teeth of the gear member,
   d) a relubrication passage operably associated with the helical ball spline to apply lubrication to the helical ball spline, and
   e) a self seating structure that permits bi-directional movement of the rack teeth of the gear segment between the rack teeth of the gear member.

2. The gear locking arrangement to claim 1 wherein and the relubrication passage is located to permit lubricant to be applied to an intermediate location of the helical ball spline.

3. The gear locking arrangement according to claim 1 the self seating structure comprises spring biasing elements applied to opposing sides of the gear segment.

4. In an aircraft having at least one actuation system driven by a power source and coupled to an application by a rotating gear member, a low friction safelock system to selectively prevent rotation of the rotating gear member comprising:
   a) a gear segment mounted about a longitudinal axis substantially parallel to and spaced apart from the radially outermost tangent of the gear member, the gear segment being rotatable about that longitudinal axis such that its teeth can selectively engage with the teeth of the gear member,
   b) a helical ball spline mounted about the longitudinal axis for supporting the gear segment for axial and rotational motion,
   c) relubrication means connected to the ball spline for applying lubricant to the ball spline intermediate of the ends and radially outwardly from the longitudinal axis, and
   d) a support structure for retaining the gear segment, that structure including a first spring bearing element that urges the gear segment toward one end of the longitudinal axis and a second spring bearing element that urges the gear segment towards the other end of the longitudinal axis.

5. The aircraft according to claim 4 wherein the safelock system also includes an actuation member for causing rotation of the gear segment and wherein the portions of the teeth of both the gear member and the gear segment which first come into engagement are tapered toward the side of the teeth first coming into engagement.

6. A mechanical assembly comprising:
   a) a movable gear member having a plurality of gear teeth each separated by a gear space, the movable gear member being formed as a circular rack gear having its gear teeth disposed on its radially outer periphery,
   b) a locking member having a plurality of spaced-apart lock teeth, the locking member being movable into engagement with the gear member, the locking member being rotatably mounted about a longitudinal axis substantially parallel to a tangent from the motion of the gear teeth, c) the lock teeth being dimensioned to be received with clearance within said gear space and engageable with said gear teeth when the locking member is moved into engagement with the gear member d) a support structure with means for retaining the locking member and sustaining movement of the lock teeth relative to the gear teeth after the locking member has been moved into engagement with the gear member, and e) the support structure also including a ball bearing arrangement formed as a helical ball spline mounted between the locking member and the longitudinal axis for reducing friction in actuating the locking member and a relubrication arrangement disposed between the helical ball spline and the longitudinal axis for applying lubricant to the interior of the ball bearing arrangement.

7. A mechanical assembly comprising:

a) a movable gear member having a plurality of gear teeth each separated by a gear space, b) a locking member having a plurality of spaced-apart lock teeth, the locking member being movable into engagement with the gear member, c) the lock teeth being dimensioned to be received with clearance within said gear space and engageable with said gear teeth when the locking member is moved into engagement with the gear member, d) a support structure with means for retaining the locking member and sustaining movement of the lock teeth relative to the gear teeth after the locking member has been moved into engagement with the gear member, e) the support structure also including a ball bearing arrangement for reducing friction in actuating the locking member and a relubricating arrangement for applying lubricant to the interior of the ball bearing arrangement, and f) wherein the gear teeth and the lock teeth are each tapered from at least one side, that side being the side of initial contact with the gear teeth and lock teeth when the locking member is moved into engagement with the gear member.

* * * * *